United States Patent
Brzozowski (10) Patent No.: US 7,117,629 B2
(45) Date of Patent: Oct. 10, 2006

(54) BOTTOM FISH RIG

(76) Inventor: Frank T. Brzozowski, 2357 E. Dauphin St., Philadelphia, PA (US) 19125

( * ) Notice: Subject to any disclaimer, the term of this patent is extended or adjusted under 35 U.S.C. 154(b) by 166 days.

(21) Appl. No.: 10/724,859

(22) Filed: Nov. 30, 2003

(65) Prior Publication Data
US 2004/0107629 A1   Jun. 10, 2004

Related U.S. Application Data

(60) Provisional application No. 60/430,325, filed on Nov. 30, 2002.

(51) Int. Cl.
*A01K 91/00* (2006.01)
*A01K 91/14* (2006.01)
*A01K 95/00* (2006.01)

(52) U.S. Cl. .............. 43/43.15; 43/43.1; 43/43.14; 43/44.87; 43/44.98

(58) Field of Classification Search ............. 43/43.15, 43/43.1, 43.14, 44.87, 44.98
See application file for complete search history.

(56) References Cited

U.S. PATENT DOCUMENTS

| | | | | |
|---|---|---|---|---|
| 1,208,936 A | * | 12/1916 | England | 43/43.6 |
| 1,883,574 A | * | 10/1932 | Cleeland | 43/43.1 |
| 2,019,630 A | * | 11/1935 | Peeso | 43/43.11 |
| 2,177,007 A | * | 10/1939 | Smith | 43/44.88 |
| 2,703,947 A | * | 3/1955 | Petrasek et al. | 43/42.39 |
| 2,766,549 A | * | 10/1956 | Dickerson | 43/44.98 |
| 3,096,599 A | * | 7/1963 | Baron | 43/44.9 |
| 3,118,245 A | * | 1/1964 | Shriver | 43/43.15 |
| 3,701,212 A | * | 10/1972 | Gilliam | 43/44.87 |
| 4,209,933 A | * | 7/1980 | Manno | 43/43.15 |
| 4,696,125 A | * | 9/1987 | Rayburn | 43/43.14 |
| 4,888,910 A | | 12/1989 | Lewis | |
| 4,914,852 A | | 4/1990 | Hnizdor | |
| 5,022,178 A | | 6/1991 | Carlson | |
| 5,386,660 A | | 2/1995 | Levin | |
| 5,673,508 A | | 10/1997 | Snyder | |
| 5,678,351 A | * | 10/1997 | Halterman, Jr. | 43/43.1 |
| 5,887,381 A | * | 3/1999 | Stephenson | 43/43.15 |

FOREIGN PATENT DOCUMENTS

WO  PCT/US2003/038034   11/2003

* cited by examiner

*Primary Examiner*—Teri Pham Luu
*Assistant Examiner*—Bret Hayes (57) ABSTRACT

The bottom fish rig 12 has a strong leader 13 with a removable sliding c-weight 25 and a horizontal unilateral three-pronged hook 41 that resists snagging and reduces possible injuries. A horizontal unilateral three-pronged hook 41 differs from the standard treble hook by having all three barbs oriented upwards in a 180-degree plane and the hook 41 is designed to lie flat on the surface. An elongated leader 13 has a hook end 14 and a line end 16. The hook end 14 has a leader hook loop 18 and the leader line end 16 has a leader line loop 20. A first movement stop 22 is crimped to the leader 13 before the leader line loop 20. A second movement stop 24 is crimped to the leader about two-thirds of the length. A sliding c-weight 25 connects to the leader 13 between movement stops.

15 Claims, 5 Drawing Sheets

BOTTOM FISH RIG

This application claims the benefit of provisional application No. 60/430,325, filed Nov. 30, 2002.

BACKGROUND OF THE INVENTION

1. Field of the Invention

The present embodiment of the invention relates to a bottom fish rig for use in connection with fishing tackle. The bottom fish rig has particular utility in connection with fishing tackle by having a strong leader with a notable new removable sliding weight and a horizontal unilateral three pronged hook that resists snagging and reduces possible injuries. A horizontal unilateral three pronged hook differs from the standard treble hook by having all three barbs oriented upwards in a 180 degree plane and that the horizontal unilateral three pronged hook is designed to lie flat on the surface.

2. Description of the Prior Art

Bottom fish rigs are desirable for fresh water and salt water fishing. Carp and other bottom dwelling fish typically tap bait with their nose several times before picking it up. If the fish feels tension in the line when it bumps the bait, it may not strike. The following invention allows the fish to tap and pull the bait and have the leader freely move through the sliding c-weight until the leader end hits a movement stop when the bait on the hook is set. Different c-weights and horizontal unilateral three pronged hooks could be removed and also reinserted onto the leader without cutting the line.

The use of fishing tackle is known in the prior art. For example, U.S. Pat. No. 4,914,852 to Hnizdor discloses a tandem double offset fishhook includes first and second hooks, each having a shank, an offset bend curving concavely from one end of the shank and a point at the end of the bend. The shank of one of the first and second hooks is longer than the other shank with respect to the eye formed at one end of one of the shanks so as to space the points of the first and second shanks apart. The offset bends of the first and second hooks are disposed at equal inverted angles on opposite sides of a vertical plane through the first and second shanks to generate forces which cause the fishhook to rotate and spin as it is drawn through the water while being reeled in. In one embodiment, the first and second shanks are integrally formed from a single elongated wire, with the eye disposed between the ends of the shank at one end and the shanks being disposed side-by-side in parallel. In another embodiment, the shank of one hook is rigidly connected to the shank of the other hook adjacent the bend of the other hook to form a co-linear extension of the other hook. However, the Hnizdor '852 patent does not have a removable sliding weight with movement stops and a horizontal unilateral 3-prong hook that resists snagging.

Similarly, U.S. Pat. No. 2,703,947 to Petrasek discloses a fish lure comprising a concavo-convex spoon member with slightly upwardly curved sides. The spoon member being substantially tear-drop shaped in outline and having a substantially rounded front end and an elongated tail end. The spoon member having an elongated depression formed therein and located centrally and symmetrically to the longitudinal axis thereof. A readily removable elongated weight member is located within the depression. A first screw connects the weight member to the spoon. A hook member comprises a shank extending in a continuation of the longitudinal axis and has an end extending through an opening formed in the tail end. At least one hook upon the other end of the shank and another screw connects the first mentioned end of the shank to the spoon. The first screw associates the spoon member with weights having different masses. However, the Petrasek '947 patent does not have a removable sliding weight with movement stops and a horizontal unilateral 3-prong hook that resists snagging.

Additionally, U.S. Pat. No. 5,022,178 to Carlson discloses a fishing rig for live or artificial bait has a bendable member mounted between at least two hooks, particularly treble hooks, the hooks being mounted with respect to a leader such that when one hook is set in a fish, the bendable member bends upon a pull of the leader and the other hook moves toward the set hook. The bending of the bendable member forces the other hook into a set condition and enlarges the transverse width of the rig within the fish so that a double hooking action is guaranteed. However, the Carlson '178 patent does not have a removable sliding weight with movement stops and a horizontal unilateral 3-prong hook that resists snagging.

Further, U.S. Pat. No. 4,888,910 to Lewis discloses an adjustable snelled hook assembly comprises a fishing line with a trailing hook secured thereto. An auxiliary hook has a shank, a barb and an eye loosely and slidably mounted upon the fishing line adjustably spaced from the trailing hook. A coil spring is mounted upon the shank and is generally parallel to the fishing line. A plurality of continuous windings of the line extend around and snugly engage the spring and shank to anchor the auxiliary hook upon the fishing line. However, the Lewis '910 patent does not have a removable sliding weight with movement stops and a horizontal unilateral 3-prong hook that resists snagging.

Yet further, U.S. Pat. No. 5,673,508 to Snyder discloses a beaded fishing lure having a weighted body molded to a fish hook and including a beaded trailer hook. A flapper piece oscillates with lure movement about a projecting extension of the hook shank to strike the body and produce audible sound. The flapper is secured to the body with a split ring at aligned apertures and from a slot which mounts about the hook extension. The eye of the trailer book is secured to the shank of the primary hook and a bead is molded to the trailer hook. A variety of dressings mount to the bead including multi-filament skirts and molded plastic tails. However, the Snyder '508 patent does not have a removable sliding weight with movement stops and a horizontal unilateral 3-prong hook that resists snagging.

Lastly, U.S. Pat. No. 5,386,660 to Levin discloses a fishing hook with curved barb that is resistant to accidental dislodgement from the mouth of a fish, yet which does not pose a snagging hazard to persons handling it. The hook comprises a shank portion, at least one bent return portion, and a barb at the upper end of the return portion. The return portion of the hook has a longitudinal axis which is generally parallel to the longitudinal axis of the shank. The barb terminates in a sharply pointed free end contiguous with a generally semi-tear-drop shaped, relatively blunt, edge surface. That edge surface includes a curved portion spaced laterally of the longitudinal axis of the return portion of the hook and a contiguous undercut portion merging with the return portion of the hook. The curved portion of the edge surface may be directed toward or away from the shank of the hook. However, the Levin '660 patent does not have a removable sliding weight with movement stops and a horizontal unilateral 3-prong hook that resists snagging.

While the above-described devices fulfill their respective, particular objectives and requirements, the aforementioned patents do not describe a bottom fish rig that allows fishing tackle having a removable sliding weight with movement stops and a horizontal unilateral 3-prong hook that resists snagging. The Hnizdor '852, Petrasek '947, Carlson '178, Lewis '910, Snyder '508 and Levin '660 patents make no provision for a removable sliding weight with movement stops and a horizontal unilateral 3-prong hook that resists snagging.

Beside the prior art and aforementioned patents, the present invention has components that are nonobvious, novel, useful, and an improvement over other inventions in the field. A removable sliding weight and a horizontal unilateral 3-prong hook are novel by themselves individually and when used as an element in the bottom fish rig.

A removable sliding c-weight has an appearance and features different from other fishing tackle, such as egg-sinkers, triangular weights, one-eyed sinkers, and elongated salt-water lead sinkers with two bronze eyelets on the opposite ends, and the like. These commercial weights are usually attached to a fishing line by passing the line through an opening, as in the egg-sinkers, while the others are usually intended to be stationary by tying a square knot while the line is wrapped around the eyelet. To remove these weights a fisherman usually has to cut the line. Other lighter weights such as split shots have to be crimped with a tool, such as pliers, to be effective stationary weights.

A removable sliding c-weight in this invention is installed without any tool and is removed quicker than the common fishing tackle weights without cutting the fishing line or the leader to which it is attached. A removable sliding c-weight is installed by passing the line through a first slot and into a first bore, then on the opposite side by passing a leader through a second slot and into a second bore. A removable sliding c-weight would also be made stationary by passing a leader through a first slot and into a first bore, then by running a leader in a longitudinal groove from a first end to a second end, and thirdly on the opposite side passing the leader through a second slot and into a second bore. Another feature that is novel and useful in another embodiment of a removable sliding c-weight is to store fish attractant or inject other sinkable substances into a hollow hull through a hull hole and sealing it with a plug.

A horizontal unilateral 3-prong hook has an appearance and features different from other fishing tackle, such as commercial treble hooks, and other combination hooks. In the present invention a horizontal unilateral 3-prong hook is quickly attached and removed by opening and closing the snap and swivel which runs through the eye of the a horizontal unilateral 3-prong hook. In comparison to the commercial treble hook, one obvious feature that is different is its appearance and shape. A treble hook stands vertically; a horizontal unilateral 3-prong hook is almost unable to stand vertically. It is off-balanced since the eye and shank are bent toward the barb of the middle hook, and a horizontal unilateral 3-prong hook has a tendency to fall onto its horizontal side. Conversely, when a treble hook lays horizontally on its side, two of its barbs have a tendency of catching and snagging objects. In contrast a horizontal unilateral 3-prong hook has barbs that are parallel to the surface and are resistant to snagging onto objects. When the leader of a horizontal unilateral 3-prong hook is jerked, the force toward the eye causes a horizontal unilateral 3-prong hook to flip upright.

Therefore, a need exists for a new and improved bottom fish rig which can be used for fishing tackle having a removable sliding weight with movement stops and a horizontal unilateral 3-prong hook that resists snagging. In this regard, the present embodiment of the invention substantially fulfills this need.

In this respect, the bottom fish rig according to the present embodiment of the invention substantially departs from the conventional concepts and designs of the prior art, and in doing so provides an apparatus primarily developed for the purpose of fishing tackle having a removable sliding weight with movement stops and a horizontal unilateral 3-prong hook that resists snagging.

SUMMARY OF THE INVENTION

In view of the foregoing disadvantages inherent in the known types of fishing tackle now present in the prior art, the present embodiment of the invention provides an improved bottom fish rig, and overcomes the above-mentioned disadvantages and drawbacks of the prior art. As such, the general purpose of the present embodiment of the invention, which will be described subsequently in greater detail, is to provide a new and improved bottom fish rig and method which has all the advantages of the prior art mentioned heretofore and many novel features that result in a bottom fish rig which is not anticipated, rendered obvious, suggested, or even implied by the prior art, either alone or in any combination thereof.

The prior art of record neither discloses nor fairly teaches the recited limitations of the claimed combination including, but not limited to: an elongated leader, a first stop, a second stop, a c-weight, a swivel, a snap and a horizontal unilateral 3-prong hook.

There has thus been outlined, rather broadly, the more important features of the embodiment of the invention in order that the detailed description thereof that follows may be better understood and in order that the present contribution to the art may be better appreciated. There are, of course, additional features of the present embodiment of the invention that will be described hereinafter and which will form the subject matter of the claims attached.

Numerous objects, features and advantages of the present embodiment of the invention will be readily apparent to those of ordinary skill in the art upon a reading of the following detailed description of presently preferred, but nonetheless illustrative, embodiments of the present embodiment of the invention when taken in conjunction with the accompanying drawings. In this respect, before explaining the current embodiment of the embodiment of the invention in detail, it is to be understood that the embodiment of the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present embodiment of the invention.

OBJECTS AND ADVANTAGES

It is therefore an object of the present embodiment of the invention to provide a new and improved bottom fish rig that has all of the advantages of the prior art fishing tackle and none of the disadvantages.

It is another object of the present embodiment of the invention to provide a new and improved bottom fish rig that may be easily and efficiently manufactured and marketed.

An even further object of the present embodiment of the invention is to provide a new and improved bottom fish rig that has a low cost of manufacture with regard to both materials and labor, and which accordingly is then susceptible of low prices of sale to the consuming public, thereby making such bottom fish rig economically available to the buying public.

Still another object of the present embodiment of the invention is to provide a new bottom fish rig that provides in the apparatuses and methods of the prior art some of the advantages thereof, while simultaneously overcoming some of the disadvantages normally associated therewith.

The bottom fish rig has particular utility in connection with fishing tackle having a strong leader with a notable new removable sliding weight and a horizontal unilateral three pronged hook that resists snagging and reduces possible injuries.

A horizontal unilateral three pronged hook differs from the standard treble hook by having all three barbs oriented upwards in a 180 degree plane and that the horizontal unilateral three pronged hook is designed to lie flat on the lake bottom without being caught on debris and to flip upright when the leader is being reeled.

Still another object of the present embodiment is being safer by having a horizontal unilateral three pronged hook that could collapse downward when stepped on by someone and prevent an injury.

Still another object of the present embodiment of the invention is to provide different c-weights and horizontal unilateral three pronged hooks that could be removed and also reinserted onto the leader without cutting the line.

Also another object of the present invention is to construct a hollow removable sliding c-weight that could have many different objects and substances inserted into its hollow bull to affect the rate of descent and to attract fish.

Even still another object of the present embodiment of the invention is to provide a bottom fish rig for fishing tackle having various removable sliding weights made of different products having various sizes, shapes and styles.

Lastly, it is an object of the present embodiment of the invention is to provide a bottom fish rig for fishing tackle having a horizontal unilateral three pronged hook that could be easily removed and substituted for other size or different style hooks for use with different baits.

These together with other objects of the embodiment of the invention, along with the various features of novelty that characterize the embodiment of the invention, are pointed out with particularity in the claims annexed to and forming a part of this disclosure. For a better understanding of the embodiment of the invention, its operating advantages and the specific objects attained by its uses, reference should be made to the accompanying drawings and descriptive matter in which there are illustrations of the preferred embodiments of the invention.

BRIEF DESCRIPTION OF THE DRAWINGS

The embodiment of the invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Referring now to the drawings, and particularly to FIGS. 1–5, a preferred embodiment of the bottom fish rig of the present invention is shown and generally designated by the reference numeral 12.

Figure 1:
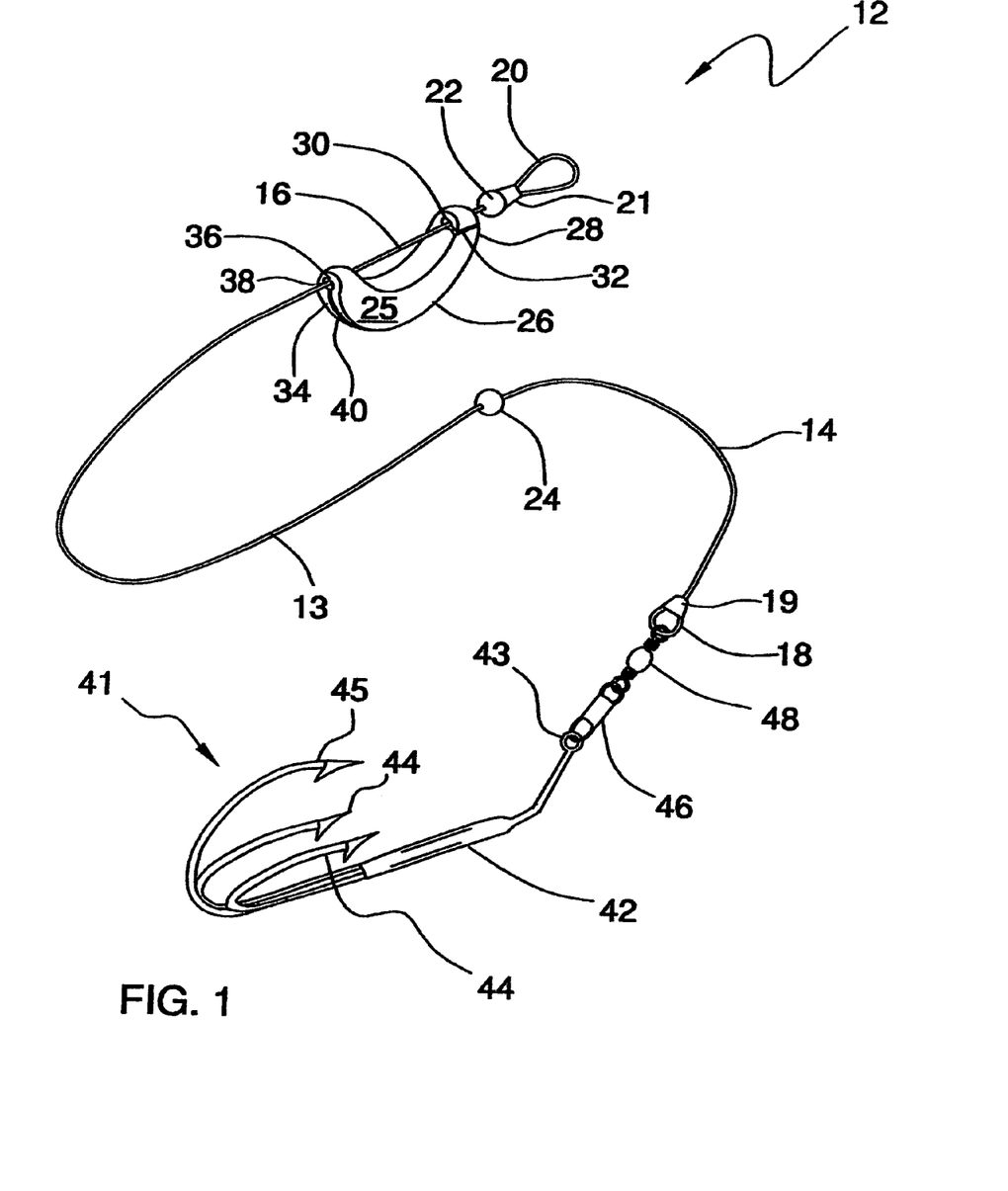
FIG. 1 is a top perspective view of the preferred embodiment of a bottom fish rig constructed in accordance with the principles of the present invention.

In FIG. 1, a new and improved bottom fish rig 12 of the present invention for fishing tackle having a removable sliding c-weight with a horizontal unilateral three-pronged hook is illustrated and will be described. More particularly, a bottom fish rig 12 has an elongated leader 13 that has two opposite ends, a leader hook end 14 and a leader line end 16. A leader hook end 14 has a leader hook loop 18 that is held securely by a crimped hook loop lug 19 therein. A leader line end 16 has a leader line loop 20 that is attached to the fishing line from a fishing rod. A line end 16 has a leader line loop 20 that is held securely by a crimped line loop lug 21 therein. A first movement stop 22 is frictionally crimped to the leader 13 adjacent the leader line end 16 and after the line loop lug 21. A first movement stop 22 is comprised of a crimped split shot. A second movement stop 24 is frictionally crimped to the leader 13. The second movement stop 24 is located approximately two-thirds of the distance of the bottom fish rig 12 and located between the line leader loop 20 and at the other end the leader hook loop 18. The second movement stop 24 is comprised of a crimped split shot. The second movement stop 24 is located on the leader 13 approximately one-third of the distance from the leader hook end 14.

Figures 2, 3:
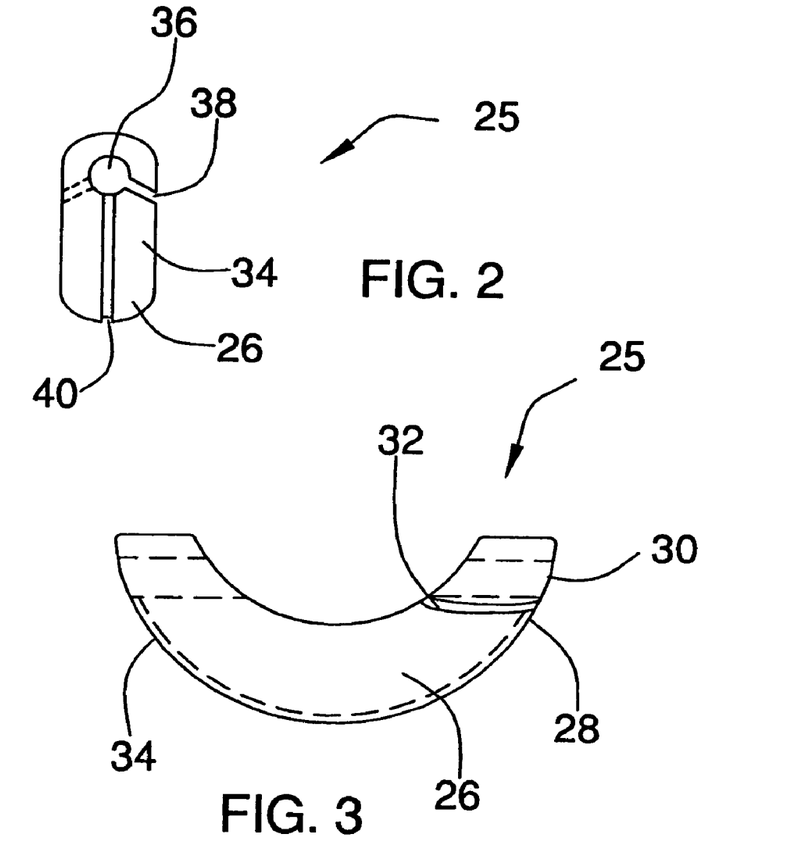
FIG. 2 is a front view of a second end of a removable sliding c-weight of a bottom fish rig of the present embodiment of the invention.
FIG. 3 is a front view of a left side of a removable sliding c-weight of a bottom fish rig of the present embodiment of the invention.

In FIG. 1 a removable sliding c-weight 25 is attached to the leader 13 and is enable to slide freely two-thirds of the length of the leader 13 to the movement stop 24. The c-weight 25 has substantially the c-shape with three main sections, a first end 28, a c-weight hull 26, and a second end 34. The c-weight 25 has a first end 28 with a first bore therethrough 30. The c-weight 25 has a c-weight hull 26 in the central and lower middle section with a longitudinal groove 40. A longitudinal groove 40 extending across the outside of the hull 26 and it is a shallow central semi-cylinder groove that connects with the first end 28 and the second end 34. The c-weight 25 has second end 34 with a second bore therethrough 36. The c-weight 25 has a first slot 32 connected to a first bore 30. The c-weight 25 has a second slot 38 as shown in FIG. 2 connected to a second bore 36. The c-weight 25 has a longitudinal groove 40 therein for allowing the c-weight to be fixedly connected to the leader 13.

Again in FIG. 1 one-third of a bottom fish rig 12 is a leader hook end 14. A swivel 48 is connected to the leader hook loop 18 by running the leader through the eye of the swivel 48 and having it secured by a crimped hook loop lug 19. A snap 46 is connected to the swivel 48. A horizontal unilateral three-pronged hook 41 is attached with a snap 46. A unilateral three-pronged hook 41 has a shank 42 with an eye 43. A wire from an opened snap passes through the eye 43 of the unilateral three-pronged hook 41, then the snap 46 is closed.

A horizontal unilateral three-pronged hook 41 is connected to a snap 46 and a swivel 48 that are attached to a leader 13. A horizontal unilateral three-pronged hook 41 has three solidly joined barbs, a center barb 45 and a pair of symmetrical outer barbs 44 which are disposed within the 180 degree section. The center hook barb 45 stands erect in the same plane as the shank 42 and eye 43. This upward and inward placement of outer barbs 44 allows the horizontal unilateral three-pronged hook 41 to slide upon the lake bottom without being caught on debris.

In FIG. 2, the second end 34 of the bottom fish rig 12 is illustrated and will be described as by looking from the front but starting from the rear. The leader 13 slides within the removable sliding c-weight 25 as shown in FIG. 1 by passing the leader 13 through the second slot 38 and wiggling it into the second bore 36. The second end 34 has the second bore therethrough 36. The c-weight 25 has the second slot 38 with a space to the second bore 36. The c-weight 25 has substantially the c-shape when the second end 34 is held upright and the c-weight 25 is viewed from the left side as in FIG. 3. As an option, the c-weight 25 has a longitudinal groove 40 in its mid-center therein for allowing the c-weight to be fixedly connected to the leader 13 by inserting the leader 13 into the groove 40 and running the leader through the first end 28 across the mid-center bottom of the hull 26 and through the second end 34.

Figure 4:
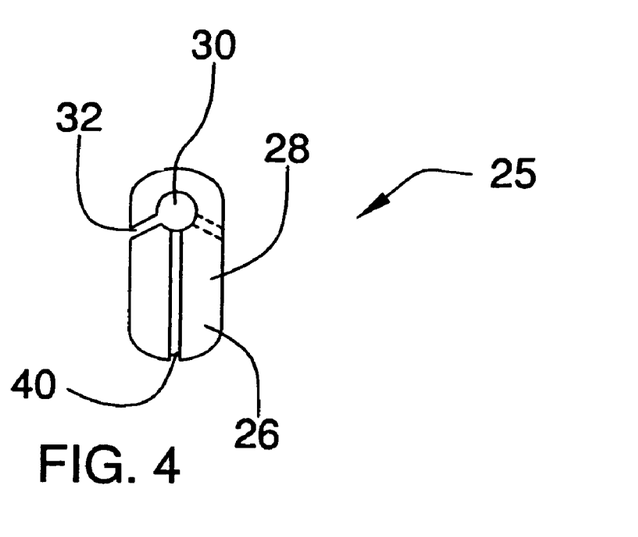
FIG. 4 is a front view of a first end of a removable sliding c-weight of a bottom fish rig of the present embodiment of the invention.

In FIG. 3, the bottom fish rig 12 is illustrated and will be described from the left side view. The removable sliding c-weight 25 is connected to the leader 13 as shown in FIG. 1. The c-weight 25 has substantially the c-shape by viewing the left side with the second end 34 on top, the hull 26 vertically and the first end 28 on the bottom. The c-weight 25 has the first end 28. The c-weight 25 has a space from the first slot 32 to the first bore 30 as shown in FIG. 4. The leader 13 enters the c-weight 25 by sliding it horizontally into the first end slot 32, and subsequently is moved into the first bore 30 which is behind the first end slot 32. The leader 12 is also removed by sliding it from the first bore 36 into the slot 38 and away from the c-weight 25. The second end 34 has a second end slot 38 and second end bore 36 as shown in FIG. 2, but since it is on the opposite side of the c-weight 25 they can not be viewed from this left side view.

In FIG. 4, the first end 28 of the bottom fish rig 12 is illustrated and will be described as by looking from the front. The leader 13 slides within the c-weight 25 as shown in FIG. 1 by passing the leader 13 through the first slot 32 and wiggling it into the first bore 30. The first end 28 has the first bore therethrough 30. The c-weight 25 has a space from the first slot 32 to the first bore 30. The c-weight 25 has substantially the c-shape when the second end 34 is held upright, the first end 26 is toward the bottom and the c-weight 25 is viewed from the left side as in FIG. 3. As an option, the c-weight 25 has a longitudinal groove 40 in its mid-center therein for allowing the c-weight to be fixedly connected to the leader 13 by inserting the leader 13 into the groove 40 and running the leader through the first end 28 across the mid-center bottom of the hull 26 and through the second end 34.

FIG. 1 through FIG. 4 are illustrations of the preferred embodiment of a removable sliding c-weight 25 of a bottom fish rig 12. A nonobvious factor in the preferred embodiment is the c-weight first end 28 has a rising inclined first slot 32 connecting the first bore 30 on the left side. The second end 38 has a rising inclined second slot 38 connecting the second bore 36 on the right side. The inclined shape of the gap in the slot hinders the c-weight 12 from working its way off of the leader 13.

FIG. 5 through FIG. 8 are illustrations of a second embodiment of a removable sliding c-weight 25 of a bottom fish rig 12. New features in the second embodiment of a removable sliding c-weight 25 are affiliated with a hollow c-weight hull 26 having a c-weight hull hole 27 and a c-weight hull hole plug 39. In the second embodiment small objects and different substances could be inserted into the c-weight hull hole 27 such as sand, clay, pebbles, stones, glass, ceramics, brick, silicone, bismuth, plastic, cement, epoxy, glue and pieces of metal, including lead pellets and lead substitutes such as different alloys of iron, steel, aluminum, tin, brass, bronze, zinc, nickel, and recyclable by products, and the like. Another use for a c-weight hull hole 27 could consist of inserting dense material with specific gravity heavier than water with different fluids including water with dissolved products, pheromones, scents, flavors, blood, egg, grounded fish parts, poultry, beef liver, insect parts, fish attractants, fruit, sugar, jelly, cheese, bread, food products, and the like. The c-weight hull could be made of various volumes and of many substances including lead, lead with a skin from electroplating, spraying, dipping, lead with a coating of zinc orthophosphate, paint, latex, vinyl, nylon, wax, gum, rubber, rubber composite, fiberglass polymer, harden tar, with or without a sealer, polymer based composite material, and also a mixture thereof. The c-weight hull could be made of various volumes and of many substances including different alloys of iron, steel, zinc, aluminum, tin, brass, bronze, ferrotungsten, and combinations thereof, and recyclable mixtures, plastic, synthetic containers, compressed wood, waxed products, epoxy, glue, rubber, frozen fluids, and the like. As an option, small holes could be drilled into the removable sliding c-weight hull 27 by the fisherman to attract fish.

Another difference in the second embodiment in FIG. 5 through FIG. 8 the c-weight first end 28 has the first slot on the right side; and an a-frame-shaped inclined second slot 38 on the second end on the left side. The shape of a first slot 32 and a second slot 38, with the different inclines hinder the c-weight 12 from working its way off of the leader 13. The slots 32 and 38 could be formed into other geometric shapes to make small obstacles to prevent the leader for accidentally working its way out of the first bore 30 and the second bore 36.

Figure 5:
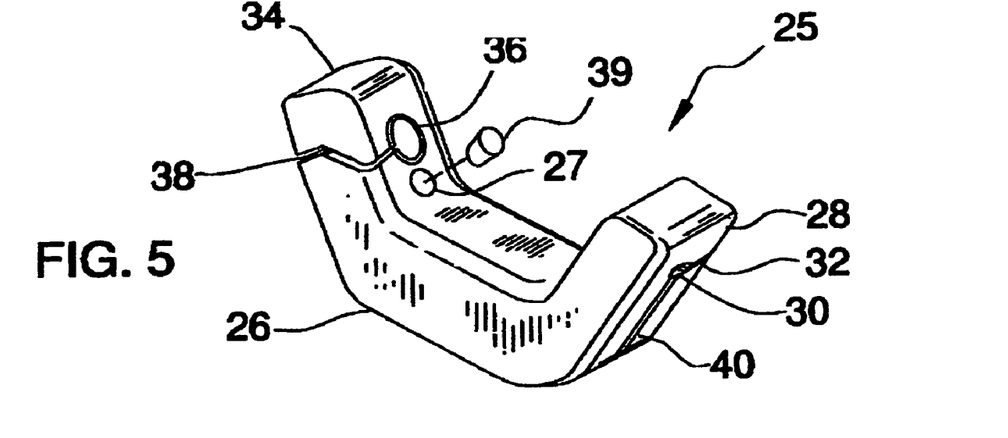
FIG. 5 is a top left side perspective view of a second embodiment of a removable sliding c-weight of a bottom fish rig of the invention.

In FIG. 5 a second embodiment of the removable sliding c-weight of a bottom fish rig is illustrated and will be described from a top left perspective view. The removable sliding c-weight 25 has substantially the c-shape with three main sections, a first end 28, a c-weight hull 26, and a second end 34 with a new feature a c-weight hull hole 27. The c-weight 25 has a first end 28 with a first bore 30 that has a space to the first slot 32 on the right side. The c-weight 25 has a longitudinal groove 40 running down the outer mid-center of the first end 28 to the bottom, and extending beneath the outer c-weight hull 26 to the second end 34. The c-weight second end 34 has a second bore 36 that is connected to a second slot 38 on the left side. Beneath the second bore 36 at the inner mid-center junction and top of the c-weight hull 26 going toward the first end is a c-weight hole 27. In this embodiment the c-weight hull 26 is hollow and the c-weight hull plug 39 is used to keep substances for entering or leaving the hollow hull 26. A leader 13 is attached on the right side by moving it horizontally through the first slot 32 into the first bore 30 over the top of the second end 34 down the left side to the second slot 38 and slid into the second bore 36 for a freely sliding c-weight. A fixed c-weight would have the leader inserted into the longitudinal groove 40 first then through the first slot 32 and into the first bore 30 and subsequently to the second slot 38 and into the second bore 36.

Figure 6:
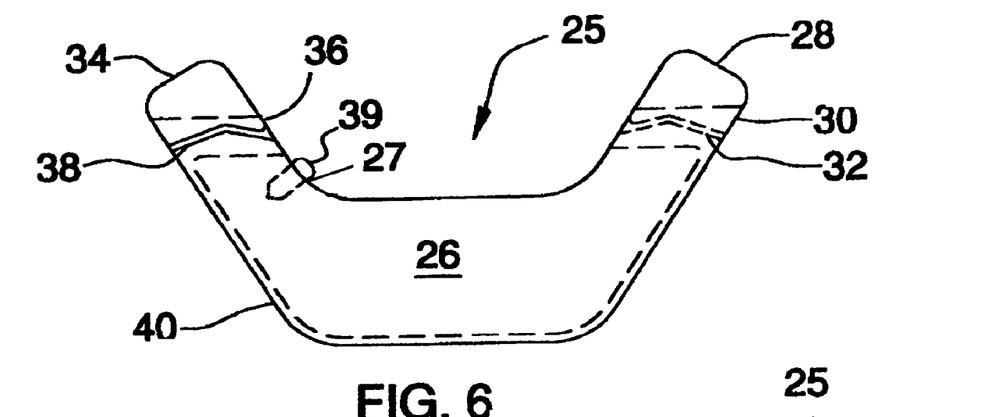
FIG. 6 is a left side view of a second embodiment of a removable sliding c-weight of the bottom fish rig of the invention.

In FIG. 6 a second embodiment of the removable sliding c-weight 25 of a bottom fish rig 12 is illustrated and will be described from the left side view. The second end 34 has a second slot 38 that penetrates to the second bore 36. Beneath the second bore 36 and toward the inner top of the c-weight hull 26 is the c-weight hull hole 27. The hollow c-weight hull 26 has a c-weight hole 27 with a c-weight hull plug 39 that could be removed and reinserted. Different substances could be inserted into the c-weight hole 27 to affect the action of the bottom fish rig 12.

Figure 7:
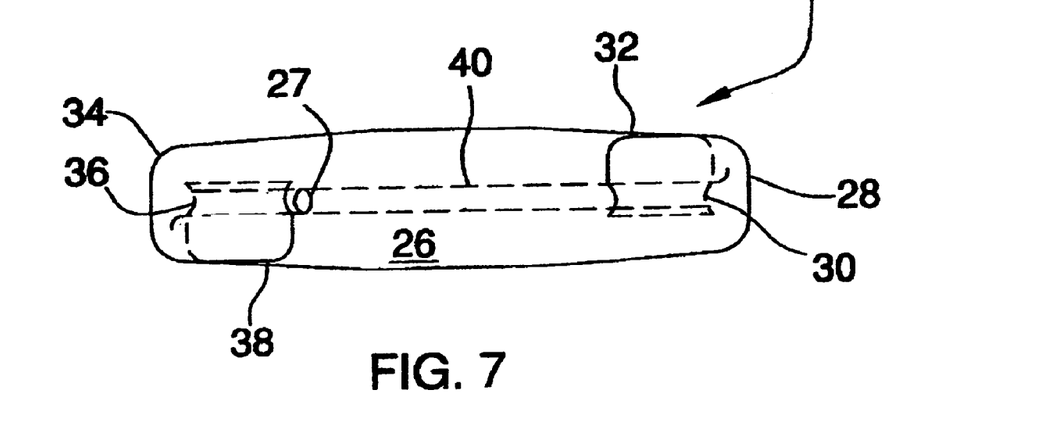
FIG. 7 is a top view of the second embodiment of the of a removable sliding c-weight bottom fish rig of the invention.

In FIG. 7 a second embodiment of the removable sliding c-weight 25 of a bottom fish rig 12 is illustrated and will be described from the top view. The c-weight first end 28 has a first slot 32 on the right side that connects to the first bore 30. The longitudinal groove 40 runs across the mid-center bottom of the c-weight hull 26. The c-weight second end 34 has a second slot 38 on the right side that is connected to the second bore 36. Beneath the second bore 36 and toward the inner top of the c-weight hull is the c-weight hull hole 27.

Figure 8:
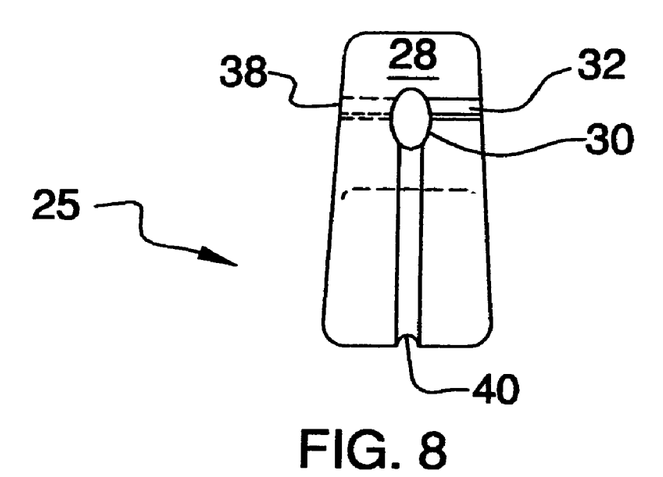
FIG. 8 is a front end view of the second embodiment of the c-weight of the bottom fish rig of the present embodiment of the invention.

In FIG. 8 a second embodiment of the removable sliding c-weight 25 of a bottom fish rig 12 is illustrated and will be described from the front view. The c-weight first end 28 has a c-weight first bore 30 connected to a c-weight first slot 32 on the right side. The inclined a-framed slopes of the two slots are indicated by thicker lines at the c-weight first slot 32 and at the hidden c-weight second slot 38. The shallow central semi-cylinder groove longitudinal groove 40 descends from the first bore 30 down to the bottom of the c-weight hull 26.

Figure 9:
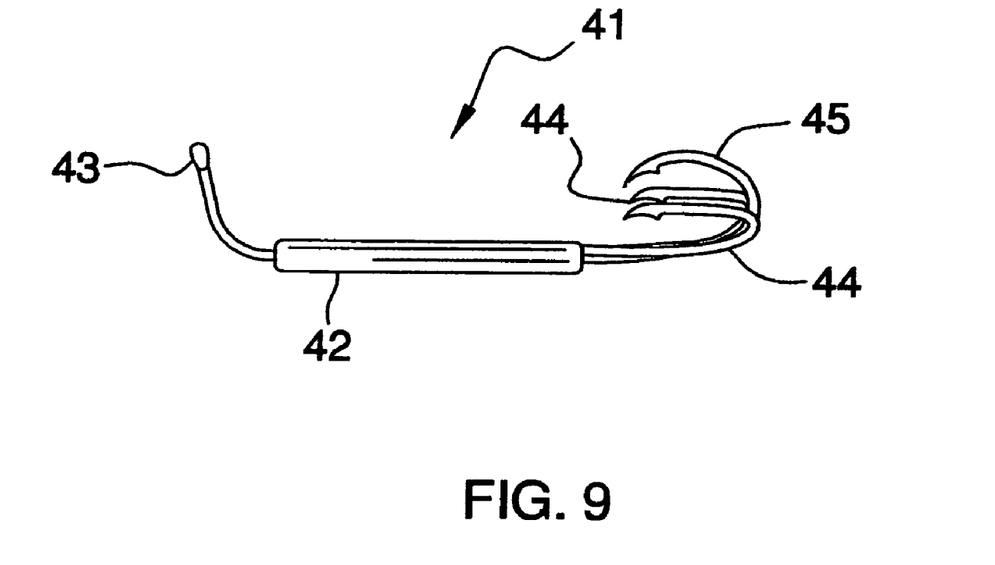
FIG. 9 is a side perspective view of the third embodiment of a horizontal unilateral 3-prong hook of a bottom fish rig of the invention.
Figure 10:
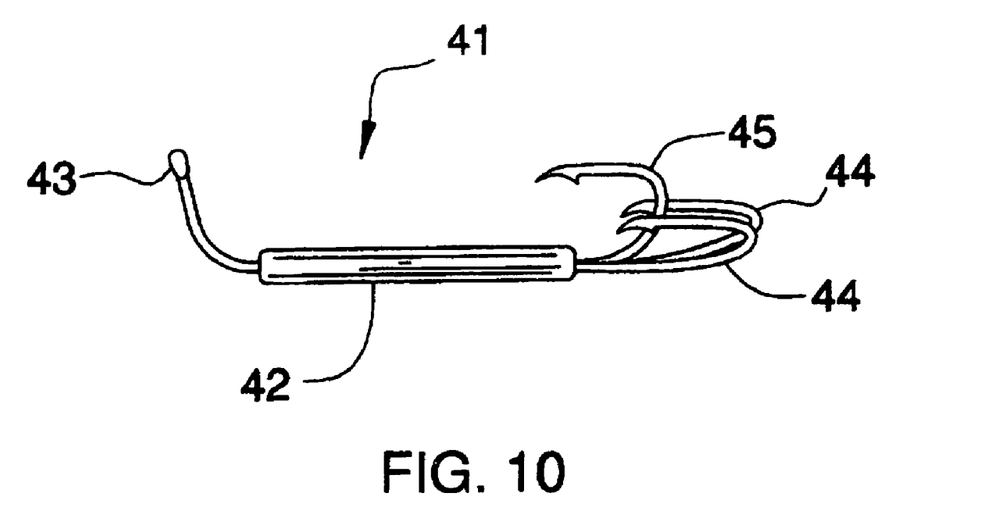
FIG. 10 is a side perspective view of a fourth embodiment of a horizontal unilateral 3-prong hook of a bottom fish rig of the invention.
Figure 11:
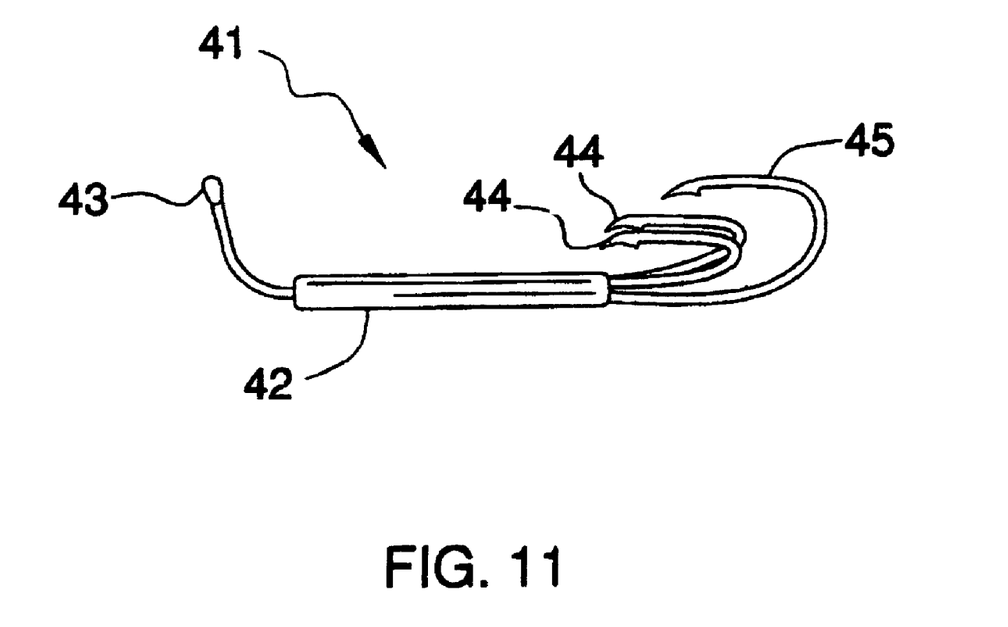
FIG. 11 is a side perspective view of a fifth embodiment of a horizontal unilateral 3-prong hook of a bottom fish rig of the invention.

FIG. 9 through FIG. 11 are illustrations of 3 more embodiments of a of a bottom fish rig 12. A horizontal unilateral three-pronged hook 41 used in FIG. 1 has larger and wider hooks with a smaller shank 42 to eye 43 distance. Horizontal unilateral three-pronged hooks 41 illustrated in FIG. 9 through FIG. 11 represent some of the different embodiments and styles that could be incorporated into structuring a horizontal unilateral three-pronged hook 41. A horizontal unilateral three-pronged hook 41 has a set of three solidly joined barbs, a vertical center hook barb 45 and a pair of two outer hook barbs 44 are located within an upper 180-degree section. The center hook barb 45 stands erect in the same plane as the shank 42 and eye 43 which are bent upward from the horizontal position. The two outer hook barbs 44 are symmetrical between about 45-degrees to about 10-degrees from the flat surface and the same degrees from the center hook barb 45. Whereby when the center hook barb 45 is erected perpendicular to the horizontal surface, the angles of the two symmetrical hooks are 180-degrees when added together; if one outer hook barb 44 is about 20-degrees, the other outer hook barb 44 will be about 160-degrees; if one outer hook barb 44 is about 45-degrees, the other outer hook barb 44 will be 135-degree; and if one outer hook barb 44 is 30-degrees, the other outer barb 44 will be 150-degrees. This upward placement of the barbs 44 that are parallel to the bottom surface allows the horizontal unilateral three-pronged hook 41 to drag upon the bottom of the water without the prongs being caught on debris. A horizontal unilateral 3-prong hook 41 has a tendency to fall onto its horizontal side. When the leader 13 of a horizontal unilateral 3-prong hook 41 is jerked, the force toward the eye 43 causes a horizontal unilateral 3-prong hook 41 to flip upright.

In FIG. 9, a third embodiment, a horizontal unilateral three-pronged hook 41 of the bottom fish rig 12 is illustrated and will be described. A horizontal unilateral three-pronged hook 41 is connected to a snap 46 and a swivel 48 that are attached to a leader 13. A horizontal unilateral three-pronged hook 41 has three equidistant barbs, a vertical center hook barb 45 and a pair of symmetrical outer hook barbs 44 which are disposed within the 180 degree section. As compared to FIG. 1 the third embodiment has a longer shank 42 and a smaller center hook barb 45 and smaller outer hook barbs 44. This upward and inward placement of the barbs 44 allows the horizontal unilateral three-pronged hook 41 to slide without snagging.

In FIG. 10, a fourth embodiment, a horizontal unilateral three-pronged hook 41 of the bottom fish rig 12 is illustrated and will be described. A horizontal unilateral three-pronged hook 41 has a shorter vertical center hook barb 45 and a pair of symmetrical outer hook barbs 44 which are disposed within the 180 degree section. This upward and inward placement of the barbs 44 allows the horizontal unilateral three-pronged hook 41 to slide without snagging.

In FIG. 11, a fifth embodiment, a horizontal unilateral three-pronged hook 41 of the bottom fish rig 12 is illustrated and will be described. A horizontal unilateral three-pronged hook 41 has a longer vertical center hook barb 45 and a pair of symmetrical outer hook barbs 44 which are located within the 180 degree section. This upward and inward placement of the barbs 44 allows the horizontal unilateral three-pronged hook 41 to slide without snagging and to flip upright as the leader is being reeled.

While a preferred embodiment of the bottom fish rig has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present embodiment of the invention. For example, in the bottom fish rig the longer leaders could be made of wire, but the smaller ones could be made of a strong monofilament fishing line; also any suitable sturdy material such iron, steel, glass with plastic coating, may be used instead of the lead for the c-weight described. Also, the treble hook may also be made of stainless steel. The horizontal three-pronged hook could be made into hooks of many sizes, shapes angles of the barbs as well as but not limited to darts, plugs and other lures that may be used. Furthermore, a wide variety of hook sizes, different colored jigs and darts may be used with the bottom fish rig instead of the one described.

In FIG. 1 leader 13 sizes range from ¼ meter to more than 1.5 meter long for bottom fish rigs 12 that are for use with large fish and long surf fishing rods. Lugs could be replaced with knots. Removable sliding c-weights 25 range from fractions of an ounce to several ounces and others have various volumes. An alternative to the preferred embodiment a bottom fish rig could have a c-weight without slots on either side and not be removable.

Therefore, the foregoing is considered as illustrative only of the principles of the embodiment of the invention. Further, since numerous modifications and changes will readily occur to those skilled in the art, it is not desired to limit the embodiment of the invention to the exact construction and operation shown and described, and accordingly, all suitable modifications and equivalents may be resorted to, falling within the scope of the embodiment of the invention.

What I claim as new is as follows:

1. A bottom fish rig comprising:
an elongated leader having two opposite ends, a leader hook end and a leader line end, said hook end having a leader hook loop secured by a leader hook loop lug therein, said line end having a leader line loop leader secured by a leader line loop lug therein,
a first movement stop frictionally connected to said leader adjacent said line end, said first movement stop abuts the leader line loop lug,
a second movement stop frictionally connected to said leader, said second movement stop located between said first movement stop and said leader hook end, said second movement stop is located approximately one-third of the way from said leader hook end, and approximately two-thirds of the distance from the line leader loop;
a c-weight that could be removed and reinserted without cutting said leader, said c-weight having a substantially c-shape that could slide along the leader for two-thirds of said leader, said c-weight having a first end, said first end having a first bore therethrough, said c-weight having a second end, said second end having a second bore therethrough, said c-weight having a first slot to said first bore on one side, on the other side said c-weight having a second slot to said second bore, allowing the c-weight to be fixedly connected to said leader;
a swivel connected to said leader hook eye loop;
a snap connected to said swivel; and
a horizontal unilateral three-prong hook connected to said snap, swivel, and leader, said horizontal unilateral three-prong hook has a bent eye and shank in the same plane as a vertical center hook barb and a symmetrical pair of outer hook barbs which are disposed within a 180-degree section, this placement of the barbs causes the hook to lay horizontally and allows said hook to slide upon a lake bottom without being caught on debris and to flip upright when the leader is being reeled.

2. The bottom fish rig of claim 1 wherein:
said c-weight having a central longitudinal groove connecting said first bore, said c-weight hull and said second bore; and
said c-weight having a central longitudinal groove therein for allowing the c-weight to be fixedly connected to said leader.

3. The bottom fish rig of claim 1 wherein:
said c-weight having central bores in said first end and said second end to allow the leader to slide freely; and
the first slot and the second slot being inclined to hinder the leader from working its way out of the c-weight.

4. The bottom fish rig of claim 1 wherein:
said first movement stop is composed of crimped split shot; and
said second movement stop is comprised of crimped split shot.

5. A bottom fish rig of claim 1 wherein:
the leader hook loop is formed by a knot therein, and the leader line loop is formed by a knot therein.

6. The bottom fish rig of claim 1 wherein:
wherein the pair of outer hook barbs are slanted upright; and
the bent eye and shank are bent vertically in the same plane as the vertical center hook barb.

7. The bottom fish rig of claim 1 wherein:
the pair of symmetrical outer hook barbs are equidistant from the center hook barb.

8. The bottom fish rig of claim 1 wherein:
the center hook barb is longer than the symmetrical outer hook barbs.

9. The bottom fish rig of claim 1 wherein:
the symmetrical outer hook barbs are angularly symmetrical about the longitudinal axis of the bent eye and shank.

10. The bottom fish rig of claim 1 wherein:
the elongated leader is preferably one third meter long and constructed from monofilament fishing line or wire.

11. A bottom fish rig comprising:
an elongated leader having two opposite ends, a leader hook end and a leader line end, said hook end having a leader hook loop secured by a leader hook loop lug therein, said leader line end having a leader line loop secured by a leader line loop lug therein,
a first movement stop frictionally connected to said leader adjacent said line end, said first movement stop abuts a leader line loop lug,
a second movement stop frictionally connected to said leader, said second movement stop located between said first movement stop and said leader hook end, said second movement stop is located approximately one-third of the way from said leader hook end, and approximately two-thirds of the distance from the line leader loop;
a c-weight that could be removed and reinserted without cutting said leader, said c-weight having a substantially c-shape that could slide along the leader for two-thirds of said leader, said c-weight having a first end, said first end having a first bore therethrough, said c-weight having a second end, said second end having a second bore therethrough, said c-weight having a first slot to said fits bore on one side, on the opposite side said c-weight having a second slot to said second bore, beneath the second bore is a hull hole and a hull hole plug, and said c-weight having a central semi-cylinder longitudinal groove across a bottom of a hollow c-weight hull therein for the option of allowing the c-weight to be fixedly connected to said leader;

the hull hole plug stops material from entering and leaving the hollow c-weight hull;

a swivel connected to said leader hook eye loop;

a snap connected to said swivel; and a horizontal unilateral three-prong hook connected to said snap, swivel, and leader, said horizontal unilateral three-prong hook has a bent eye and shank in the same plane as a vertical center hook barb and a symmetrical pair of outer hook barbs which are disposed within a 180-degree section, this placement of the barbs causes the hook to lay horizontally and allows said hook to slide upon a lake bottom without being caught on debris and to flip upright when the leader is being reeled.

12. The bottom fish rig of claim 11 wherein:

said first movement stop is comprised of crimped split shot; and said second movement stop is comprised of crime split shot.

13. The bottom fish rig of claim 11 wherein:

the central longitudinal groove is external.

14. The bottom fish rig of claim 11 wherein:

the first slot and the second slot are inclined so as to hinder the leader from working its way out of the c-weight.

15. In combination, the bottom fish rig of claim 11 wherein:

the hollow c-weight hull is:

made of various volumes and of any substance including lead, lead with a skin firm electroplating, spying, dipping, lead with a coating of zinc orthophosphate, paint, latex, vinyl, nylon, wax, gum, rubber, rubber composite, fiberglass polymer, harden tar, with or without a sealer, polymer based composite material, and also a mixture thereof;

made of any non-lead substance including different alloys of iron, steel, zinc, aluminum, tin, brass, bronze, ferrotungsten, and combinations thereof, and recyclable mixtures, plastic, synthetic containers, compressed wood, waxed products, epoxy, glue, rubber, and frozen fluids.

* * * * *